No. 866,107. PATENTED SEPT. 17, 1907.
W. P. BARTEL.
RIVET.
APPLICATION FILED APR. 28, 1906.

Witnesses:
William C. Flass
Ernest A. Telfer

Inventor:
William P. Bartel
by his attorney, Charles S. Gooding

UNITED STATES PATENT OFFICE.

WILLIAM P. BARTEL, OF WALTHAM, MASSACHUSETTS.

RIVET.

No. 866,107.　　　Specification of Letters Patent.　　　Patented Sept. 17, 1907.

Application filed April 28, 1906. Serial No. 314,142.

*To all whom it may concern:*

Be it known that I, WILLIAM P. BARTEL, a citizen of the United States, residing at Waltham, in the county of Middlesex and State of Massachusetts, have invented new and useful Improvements in Rivets, of which the following is a specification.

The object of this invention is to provide a rivet having a head which is preferably formed of hardened steel and a shank having a conical shaped head and a stem, the conical shaped head of the shank portion of the rivet extending entirely through the disk which forms the head of the rivet with the larger end of said conical head beginning at the top of said disk and terminating at the bottom of said disk, said rivet being provided with an annular flange upon the stem portion thereof which bears against the bottom face of the disk forming the head of the rivet.

In the particular use for which these rivets are adapted, the heads of the rivets are subjected to great frictional contact and wear and it is very essential that they should be strong and firmly fastened to sheet material, and further it is desirable that the head of the rivet should be formed of hardened metal and that said head should remain fastened to the shank until it is entirely worn out by said frictional contact. These results are obtained by making the head of a disk of metal separate from a shank which is subsequently attached thereto as hereinafter described, the disk of metal being adapted to be hardened to the proper temper, while the shank is made of soft metal which can be driven into the sheet material and its prongs clenched therein in the usual manner.

The invention consists of a rivet formed and constructed as hereinafter described and particularly as pointed out in the claims.

Figure 1:
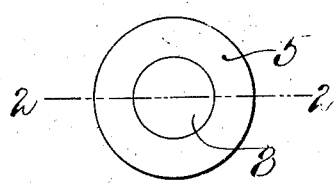
Figure 2:
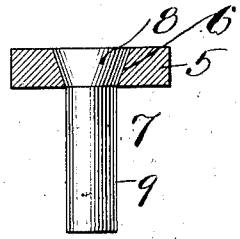
Figure 3:
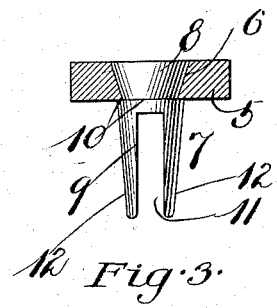
Figure 4:
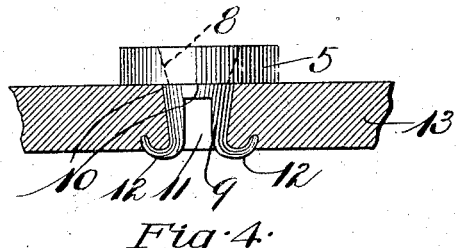

Referring to the drawings: Figure 1 is a plan view of my improved rivet. Fig. 2 is a section of the head of the rivet taken on line 2—2, Fig. 1, with the shank portion of said rivet illustrated in elevation prior to the formation thereon of the annular flange hereinbefore referred to. Fig. 3 is a side elevation of the rivet in its completed form with the head shown in section thereon. Fig. 4 is a side elevation of the rivet illustrating the same as attached to a section of sheet material by the clenching of the prongs therein.

Like numerals refer to like parts throughout the several views of the drawings.

In the drawings, 5 is the head of the rivet which consists of a disk of metal preferably hardened and having a hole 6 of conical form extending therethrough from the top to the bottom of said disk, the larger end of the hole being at the top of said disk and the smaller end of said hole at the bottom thereof. The rivet shank 7 consists of a conical head 8 which fits tightly in the hole 6 and of a stem 9 with an annular flange 10 formed thereon adjacent to the bottom of the disk 5. The stem 9 is preferably bifurcated at 11 in order that the same may be provided with legs 12, 12 which are turned over and clenched in the material 13 to which the rivet is attached as illustrated in Fig. 4, said stem tapering gradually from the outside of said flange to the bifurcated end of said stem.

In manufacturing my improved rivet the shank is first formed as illustrated in Fig. 2 with the conical head 8 and the stem 9. It is then placed in the disk 5 and subsequently the stem 9 is upset by suitable dies forming an annular flange 10 adjacent to the bottom of the disk-shaped head 5 so that said head is firmly held between the conical head 8 and the annular flange 10. The stem 9 is preferably of tapered or conical shape from the flange 10 to the end thereof so that when the rivet is attached to a piece of material said stem will readily force its way thereinto. In using the rivet in the material 13 to which it is desired that it shall be attached, the prongs 12, 12 are turned outwardly and clenched in the material in the manner illustrated in Fig. 4.

The construction hereinbefore set forth renders my improved rivet a practical one for the purpose for which it is intended. In any hard headed rivet in which the head is conical and extends through a disk forming the hardened head, but does not have a flange on the under side to make the shank and the hard headed washer like one piece, there is great danger, both in the manufacture of the rivet as a whole and in its subsequent use in an automobile tire, of the hardened head splitting. The rivet is fastened to the tire either as illustrated in the drawings (Fig. 4) or by riveting the shank to a washer upon the inner side of the material, that is, upon the opposite side of the material to that upon which the hardened head of the rivet is located. The reason for the cracking of the hardened head, in attaching the same to the tire, is that the shank of the rivet is upset when riveting the same to said washer and upon the inner side of the leather. This upsetting must be done by resting the other end of the rivet shank, viz., that end to which the disk is attached, upon a hard surface, such as an anvil, and when a rivet is hammered to rivet it to the washer or to the tire, the conical portion of the rivet which is located inside said hardened head is spread out or upset, thus cracking the hardened head. This is found to be the case in a large proportion of rivets which are made without the flange 10, but where the flange hereinbefore described is used, then the disk forming the head can be supported upon an anvil hollowed out in the central portion thereof so as not to bear directly upon the rivet, in which case the flange 10 will take all of the force of the blow and any upsetting which may take place in the rivet shank while being thus riveted will occur between the flange and the riveted end of the rivet stem, the conical portion of the shank remaining of the same size inside the disk after the rivet has been clenched as before, so that the objectionable and expensive cracking of the heads or disks, due to the upsetting of the conical portion of the rivet where it passes through the hardened head, is avoided.

In addition to the practicability of attaching my improved rivet to the tire by reason of the flange or shoulder 10, said rivet is also more durable and the head is less liable to crack in use, for the reason that with a rivet constructed with the flange 10, the shank of the rivet and the hardened head can be very strongly fastened together and do form, in effect, a single piece, so that there is no play between the parts. Again, the shank of my improved rivet when being inserted in the leather and riveted therein, as hereinbefore set forth, is easily held firm and straight, thus avoiding any tipping of the shank in the head of the rivet, which tipping, even to a slight degree, with a soft rivet and a hardened head, will cause said head to crack. For these reasons the construction of rivet hereinbefore set forth produces a strong, practical and durable device, whereas the same construction without the flange or shoulder would be impracticable and weak and has been so demonstrated by extensive practical use.

Further practical advantages derived from rivets constructed as hereinbefore set forth consist in the fact that the same are fed automatically in a machine for the purpose, the head and the shank being fastened together as one piece, and the same are capable of being driven through the leather and riveted thereto. It will be readily seen that my improved rivet and head being in one piece, it is an easy matter to feed the same in an automatic machine which also drives the shank into the leather and rivets the end thereof to a washer upon the inner side of the leather, as compared with the difficulties that would be encountered in an attempt to feed a rivet and a head in two separate pieces and attach the same to the leather or rubber forming the tire.

Another advantage to be derived from my improved rivet is that it is absolutely impossible to turn or rock the head relatively to the shank, the two being so strongly connected together that they are like one piece. The construction described is also practicable from a merchantable point of view, as the same can be manufactured for a very small price and this is a requisite in an article of this character in order that the same may be sold at a price which will enable it to be used and placed upon the market.

Having thus described my invention, what I claim and desire by Letters Patent to secure is:

1. As an article of manufacture, a rivet, comprising a head provided with a hole extending therethrough of conical form from one face to the other of said rivet head; and a shank, consisting of a stem with a conical head at one end thereof fitting said hole, and an annular flange integral with said shank and bearing against the lower face of said rivet head, whereby said rivet head is securely held between said conical shank head and flange.

2. As an article of manufacture, a rivet, comprising a head provided with a hole extending therethrough of conical form from the top to the bottom of said rivet head, the larger end of said hole beginning at the top of said rivet head; and a shank, consisting of a conical head fitting said conical hole, and a stem integral with said conical head and of larger diameter than the small end of said conical head which it adjoins forming an annular flange which bears against the lower face of said rivet head, whereby said disk is securely held between said conical head and flange, said stem being tapered from said flange toward the end thereof farthest removed from said rivet head.

In testimony whereof I have hereunto set my hand in presence of two subscribing witnesses.

WILLIAM P. BARTEL.

Witnesses:
 CHARLES S. GOODING,
 ANNIE J. DAILEY.